US 12,142,965 B1

United States Patent
Nachshon et al.

(10) Patent No.: US 12,142,965 B1
(45) Date of Patent: Nov. 12, 2024

(54) POWER SOURCE SELECTION CONTROL

(71) Applicant: Quality in Flow LTD, Petach Tikva (IL)

(72) Inventors: Dov Nachshon, Rosh HaAyin (IL); David Nassi, Sdei Hemed (IL)

(73) Assignee: Quality in Flow LTD, Petach Tikva (IL)

( * ) Notice: Subject to any disclaimer, the term of this patent is extended or adjusted under 35 U.S.C. 154(b) by 0 days.

(21) Appl. No.: 18/195,972

(22) Filed: May 11, 2023

(51) Int. Cl.
*H02J 9/06* (2006.01)

(52) U.S. Cl.
CPC .............. *H02J 9/068* (2020.01); *H02J 9/061* (2013.01); *H02J 9/062* (2013.01)

(58) Field of Classification Search
CPC ............ H02J 9/068; H02J 9/061; H02J 9/062
USPC .......................................................... 307/64
See application file for complete search history.

(56) References Cited

U.S. PATENT DOCUMENTS

| | | | |
|---|---|---|---|
| 6,969,972 B2 | 11/2005 | Formenti | |
| 7,893,560 B2 * | 2/2011 | Carter | H02J 9/061 307/64 |
| 11,190,047 B2 | 11/2021 | Abe | |
| 11,476,699 B2 | 10/2022 | Peng et al. | |
| 11,515,723 B2 | 11/2022 | Coleman | |
| 11,670,946 B2 * | 6/2023 | Telefus | B60L 53/60 307/80 |
| 2021/0296925 A1 * | 9/2021 | Long | H02J 7/0031 |
| 2022/0216713 A1 * | 7/2022 | Lo | H01R 13/6275 |

OTHER PUBLICATIONS

International Search Report and the Written Opinion Dated Jun. 26, 2024 From the International Searching Authority Re. Application No. PCT/IL2024/050355. (12 Pages).

* cited by examiner

*Primary Examiner* — Michael R. Fin

(57) ABSTRACT

A system and method for power source selection control. Multiple power sources of a power supply unit are each connected to a high power load via a plurality of switching circuitries each comprising at least one pair of transistors connected in a common source configuration and positioned between a positive lead of a respective one of the power sources and the high power load. A controller detects presence of a current flow from at least one of the power sources and accordingly selects one of power sources and activates a respective one of the plurality of switching circuitries for conducting a current flow from the respective power source selected to the high power load.

18 Claims, 5 Drawing Sheets

POWER SOURCE SELECTION CONTROL

FIELD AND BACKGROUND OF THE INVENTION

Some embodiments described in the present disclosure relate to power supply control and, more specifically, but not exclusively, to power source selection control.

Electrically powered devices using and/or provided with multiple, possibly heterogeneous power sources utilized singly and/or in combination for energy supply to the respective device when in operation, have become more and more ubiquitous in recent years in various fields and applications.

One prominent example where usage of multiple power sources is particularly prevalent is in the case of portable and/or mobile electronic devices, electrically driven vehicles, and/or likewise systems, where stand-alone energy supply independent of the mains power lines may be required in the course of normal operation.

In many such devices, one or more of the power sources may be a rechargeable power source and/or energy reservoir, such as a battery and/or the like, optionally internally residing in the device and inaccessible to direct contact by users.

In some cases, a rechargeable internal battery of this sort must first be charged by an external power supply and/or charger, before the device itself can be used. The power supply may typically provide direct current (DC) or alternative current (AC) voltage, optionally through a special connector, to the device, whereas batteries and/or likewise rechargeable power sources may provide DC or voltage. Once charging is complete or reached a sufficient level, the power supply can then be disconnected, and the device will continue to run for a short period of time until the battery is depleted. Exemplary devices of this sort include for example electric cars, shaving machines, medical laser devices, rechargeable power tools etc.

In other cases, the device may be interchangeably used with either one of two or more power sources, for example, the device may be plugged in and/or connected via a power outlet to the mains electricity power line and/or other likewise AC/DC power source such as an electric generator and/or the like and operate for some time using the external power supply thus provided, and may be unplugged and/or disconnected from external energy sources at other times, relying on its internal rechargeable power source(s) and energy stored therein, either at a pre-charging phase and/or during powering by an external power source, such as a mains power line and/or the like.

SUMMARY OF THE INVENTION

It is an object of the present disclosure to describe a system and a method for power source selection control.

The foregoing and other objects are achieved by the features of the independent claims. Further implementation forms are apparent from the dependent claims, the description and the figures.

According to one aspect of some embodiments of the disclosed subject matter there is provided a system for power source selection control, comprising: at least one controller adapted to be in connection with: a plurality of power sources of a power supply adapted for providing a current flow to a high power load via at least one of the plurality of power sources, and a plurality of switching circuitries corresponding to the plurality of power sources, wherein each of the plurality of switching circuitries comprising at least one pair of transistors connected in a common source configuration and positioned between a positive lead of a respective one of the plurality of power sources and the high power load; the at least one controller being further adapted for: detecting presence of a current flow from at least one of the plurality of power sources; and in response to the detecting, selecting a respective power source of the plurality of power sources and activating a respective one of the plurality of switching circuitries for conducting a current flow from the respective power source selected to the high power load.

According to another aspect of some embodiments of the disclosed subject matter there is provided a method for power source selection control, comprising: having connection with: a plurality of power sources of a power supply adapted for providing a current flow to a high power load via at least one of the plurality of power sources, and a plurality of switching circuitries corresponding to the plurality of power sources, wherein each of the plurality of switching circuitries comprising at least one pair of transistors connected in a common source configuration and positioned between a positive lead of a respective one of the plurality of power sources and the high power load; by at least one controller connected to the plurality of power sources and controlling the plurality of switching circuitries, performing: detecting presence of a current flow from at least one of the plurality of power sources; and in response to the detecting, selecting a respective power source of the plurality of power sources and activating a respective one of the plurality of switching circuitries for conducting a current flow from the respective power source selected to the high power load.

Optionally, each of the plurality of switching circuitries comprising a voltage converter connected to the at least one controller and adapted for driving the pair of transistors.

Optionally, the plurality of power sources are each connected to a common ground.

Optionally, for each of the at least one controller, a respective power supply channel to a respective one of the at least one controller is electrically disconnected from each of the plurality of power sources.

Optionally, at least one energy reservoir is connected to at least one of the plurality of power sources and adapted for providing a current flow to the at least one controller during transition between one of the plurality of power sources to another occurred in response to the selecting.

Optionally, the plurality of power sources comprising at least one of a direct current power source and an alternating current power source.

Optionally, at least one charging circuitry is connected to at least one pair of the plurality of power sources comprising a rechargeable power source and adapted for charging the rechargeable power source using a current flow from at least one other power source of the at least one pair.

Optionally, the at least one pair of transistors comprising at least one pair of metal-oxide-semiconductor field-effect transistors.

Optionally, a pair of transistors in the at least one pair are serially connected and oppositely disposed relative to one another.

Optionally, the at least one pair of transistors comprising at least one of a pair of N-channel field-effect transistors and a pair of P-channel field-effect transistors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE INVENTION

Figure 1:
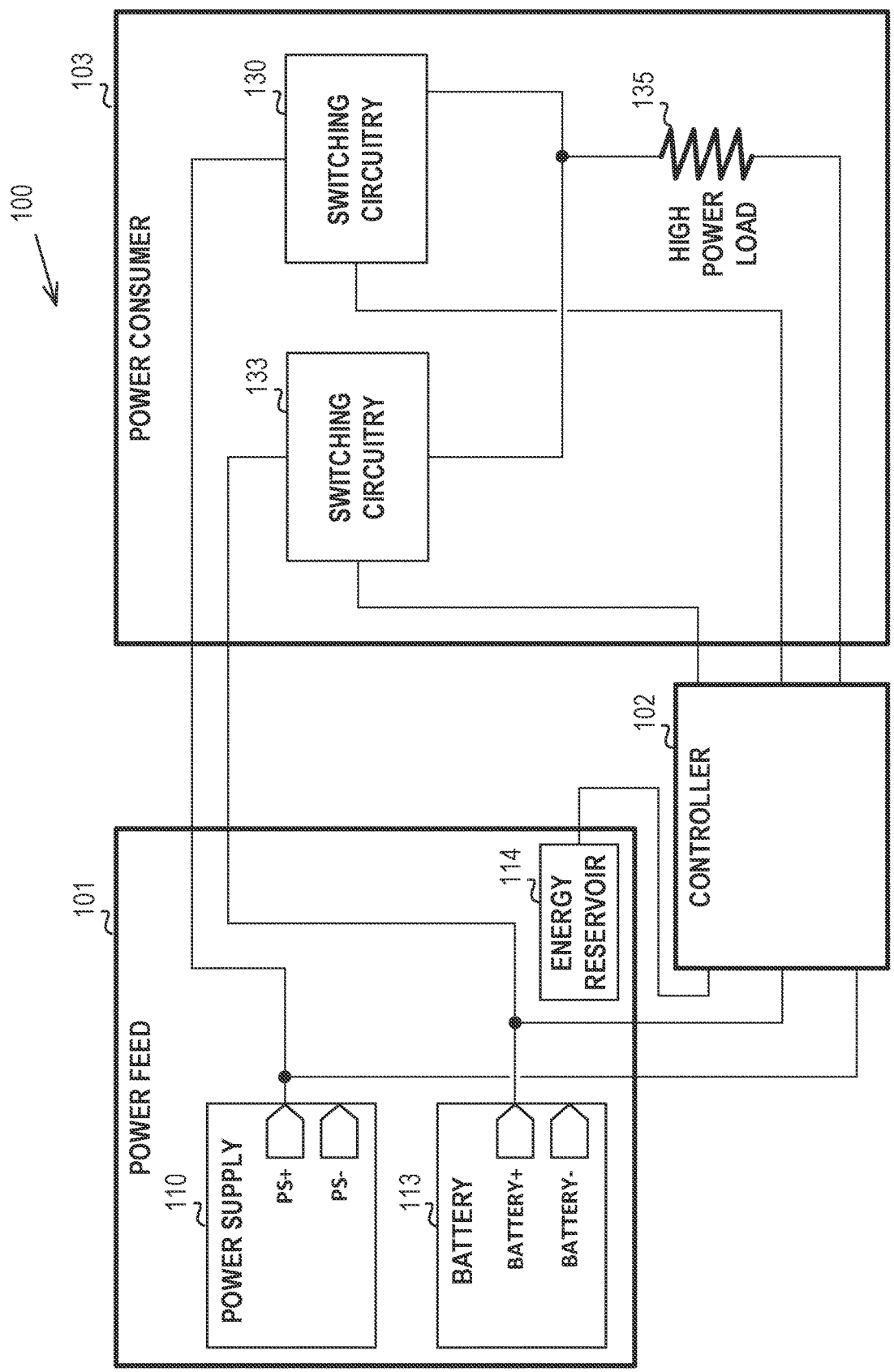
FIG. 1 is a schematic block diagram of an exemplary architecture of a system for power source selection control, according to some embodiments.

Some embodiments described in the present disclosure relate to power supply control and, more specifically, but not exclusively, to power source selection control.

One technical challenge dealt with by the disclosed subject matter is to allow for selecting a single power source out of multiple power sources to provide high power to a system containing one or more control modules and a high load, in a streamlined and fail-safe manner. When such selection takes place and/or while one power source is switched for another, there may arise a concern that a power loss may be incurred by any one of the control modules.

Another technical challenge dealt with by the disclosed subject matter is to account for various states of the system in terms of which of the multiple power sources being connected thereto at a given point in time. Optionally, the multiple power sources may all be connected to the system, a single power source may be connected, or any number of them. While more than one power source is connected, leakage current between the power sources may be required to be limited to a minimum and/or even eliminated completely, as to not cause any damage to the power sources.

Pre-existing tools and/or techniques using power source selection and/or providing high power load suffer from many disadvantages, shortcomings, and/or limitations and are thus inadequate for dealing with the technical challenges at hand.

One exemplary pre-existing approach for power source selection is employed in mobile computing devices such as laptop and/or tablet computers, where two separate power sources, e.g., a primary power source driven by external current from a mains power line and/or the like and a secondary power source such as a rechargeable battery, may be controlled and utilized interchangeably. However, as each of these power source typically uses less than 100 W, any power losses on the switches are practically negligible and therefore a solution for current leakage between the power sources that relies on simple electrical separation by diodes and/or the like is acceptable. It will be appreciated however that the losses on diodes increase dramatically as the power increases. Moreover, as there is no high load in existence that may draw all and/or most of the energy in the system during power source selection, there is no requirement to mitigate any potential power loss to a control module in the interim, such as by providing a high energy reservoir and/or the like.

Another exemplary pre-existing approach for power source selection and/or high power load provision is employed in uninterruptible power supply or uninterruptible power source (UPS), which is an electrical apparatus that may provide emergency and/or backup power to a load when an input power source thereof and/or the mains power fails. However, UPS devices are normally very large and heavy and therefore can use power relays in order to mitigate any leakage and/or losses. Furthermore, UPS devices are not required to be single fault safe.

Yet another exemplary pre-existing approach for high power load provision is found in the context of high power medical laser devices. Such devices while including both a power source connectable to a mains power line outlet and/or the like and a rechargeable battery, do not however require switching between the two power sources in the middle of the operation. Therefore, the battery is the only power source for operation and the mains is used just for charging (i.e., a lower power application).

The disclosed subject matter provides for power source selection with high power load, which overcomes the drawbacks of pre-existing approaches and has further improvements thereupon.

In some embodiments, in order to select one of multiple power sources for providing power to a high load, each power source may be connected to the load through a switch. A suitable controller and/or control module may sense the presence of each power source and activate the switch of the desired power source while deactivating all the others. The switch may comprise at least one pair of transistors, preferably field-effect transistors (FETs) and more preferably N-channel FETs, connected in a common source configuration, and used as a High-Side-Switch (i.e., placed between the power source's positive lead and the high load, and not between the load and power source's negative lead). Such switch may be connected to each of the potentially available power sources, i.e., the power sources that are and/or intended to be connected to the high load channel and to supply power thereto.

In some embodiments, an energy reservoir and/or the like may be used to provide power to the high load and/or control module(s) during a transition between power sources in order the to support continuous operation thereof. The energy reservoir may be rechargeable, and may further be provided with a corresponding charging circuitry. The charging circuitry may use power from a power source connected to an external energy supply, such as a mains power line and/or the like.

In some embodiments, the one or more control modules may be separated from the high load channel electrically, such as for example by placing diodes and/or the like between each power source and the control module(s) in such a way that no current can be conducted from the control module to the high load.

Optionally, the energy reservoir and/or likewise component used for providing power during a transition between power sources, may be required to provide power only to the control module(s), e.g., due to separation thereof from each of the multiple power sources, as discussed herein. The power required by the control module(s) may be therefore much smaller than the power required by the high load, such as for example, smaller by a square multiplication value of a ratio between a power consumption of the high load and of the control module(s).

Optionally, all power sources may be connected to a common ground (e.g., a negative potential may be connected between all power sources), in order to enable operation of at least one control module (e.g., a single, central hardware and/or software control module) regardless of which power source being selected.

Optionally, the at least one pair of transistors utilized in a respective switch through which one of the power sources may be connected to and/or disconnected from the high power load, may be driven by the control module(s) via a charge pump and/or any likewise voltage conversion technology, such as for example a DC-to-DC converter and/or the like. Additionally or alternatively, another energy source with higher voltage (i.e., relative to a voltage of a respective one of the power sources connected via the switch and/or the like) may be utilized for driving the pair of FETs.

Optionally, the at least one pair of transistors in at least one of the plurality of switching circuitries may comprise and/or be a pair of metal-oxide-semiconductor field-effect transistors (MOSFETs) and/or the like. Additionally or alternatively, other suitable FETs may be employed.

In some embodiments, the pair of transistors may be serially connected and/or oppositely disposed relative to one another.

In some embodiments, the at least one pair of transistors in at least one of the plurality of switching circuitries may comprise and/or be a pair of N-channel FETs (N-FETs). Additionally or alternatively, the at least one pair of transistors (e.g., FETs and/or MOSFETs etc.) may comprise and/or be P-channel FETs (P-FETs). It will be appreciated that in a case where P-FETs are used as switches for the power sources, a need of using voltage converters such as charge pumps and/or the like for driving the FETs may be eliminated, however, such approach may result in reduced energetic efficiency and/or involve higher cost in manufacturing and/or operation, as compared to a respective switching circuitry using N-FETs, such as described herein.

Optionally, the multiple power source may comprise direct current (DC) power sources, alternate current (AC) power sources, and/or any likewise power sources and/or combinations thereof.

Optionally, one or more of the power sources may be rechargeable, and one or more charging circuitries may be provided for charging any one of the rechargeable power sources, such as by using power from one or more of power sources connected to external power supply such as a mains power line and/or the like.

One technical effect of utilizing the disclosed subject matter is to provide for energy efficient high load power source selection control. By using transistors (e.g., FETs) in the switching circuitry, energy consumption may be conserved and/or reduced, as less quiescent power consumption may be required and/or used.

Another technical effect of utilizing the disclosed subject matter is to provide for lower ON-resistance, as achieved by usage of transistors such as FETs and/or the like in the switching circuitry, thus giving more power to the load in turn.

Yet another technical effect of utilizing the disclosed subject matter is to eliminate usage of any moving parts and/or elements containing thereof, thereby reducing mean time between failures (MTBF), i.e., predicted elapsed time between inherent failures of any mechanical and/or electrical system components.

Yet another technical effect of utilizing the disclosed subject matter is that no cooling is required for the transistors (e.g., FETs) and/or the switching circuitry incorporating thereof, due to the energetic efficiency thereof as discussed herein.

It will be appreciated by a person skilled in the art that using the common source configuration for the pair of transistors (e.g., FETs) as discussed herein prevents current from being conducted back into a power source from other power sources and achieves the purpose of protecting each power source from leakage currents which may damage it.

It will further be appreciated by a person skilled in the art that using charge pumps and/or any likewise voltage conversion technology and/or another energy source with higher voltage and/or the like for driving the transistors where applicable (e.g., N-Channel FETs and/or the like) by the control module(s) enables operation thereof as high side switches (as FETs, particularly N-Channel FETs and/or the like, may be typically designed to be used as Low-Side-Switches), without compromising their superior efficiency and lower ON-resistance.

It will yet further be appreciated by a person skilled in the art that due to the separation of the control module(s) from the high power according to some embodiments of the disclosed subject matter, using a High-Side-Switch may be thus made mandatory.

Other and/or additional technical challenges, approaches, and/or effects may be apparent to a person skilled in the art in view of the present disclosure.

One practical application in which the disclosed subject matter may be useful and/or advantageous is quick heating of fluids, optionally taking place in field conditions, where no power supply from a mains power line may be available. For example, when performing a blood transfusion and/or other intravenous (IV) therapy administration, it may be desired to warm the blood and/or fluid administered to a body temperature, and to do so as fast as possible. Such task may thus require high energy load, on the one hand; yet, a heating device fulfilling such purpose may be required to be light weighted and robust as much as possible, in order to afford portability and usability thereof, on the other hand. By utilizing the disclosed subject matter, the aforesaid requirements may thus be accomplished in a cost effective manner.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
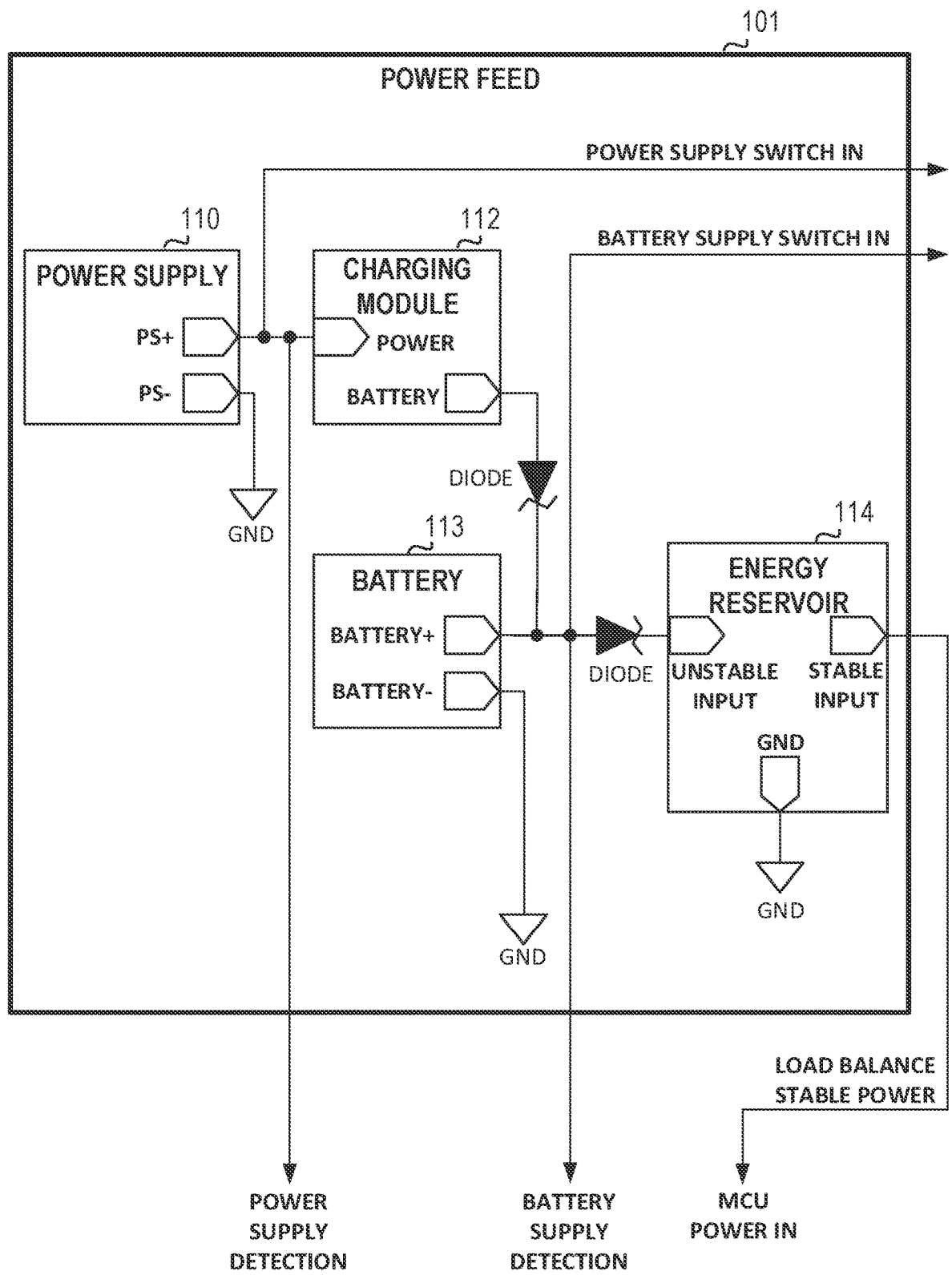
FIG. 2 is a schematic block diagram of an exemplary power feed unit of a system for power source selection control, according to some embodiments.
Figure 3:
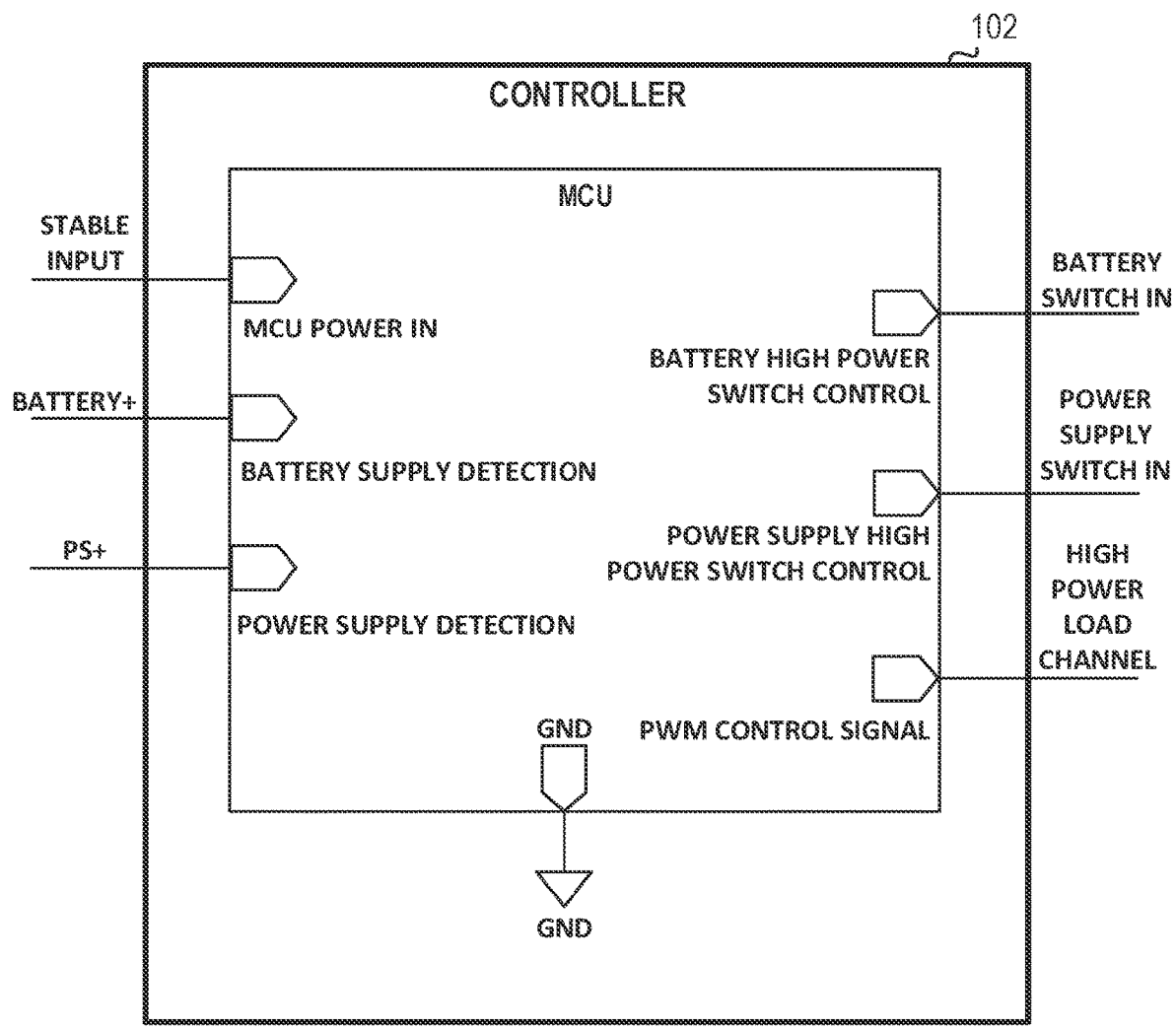
FIG. 3 is a schematic block diagram of an exemplary controller of a system for power source selection control, according to some embodiments.
Figure 4:
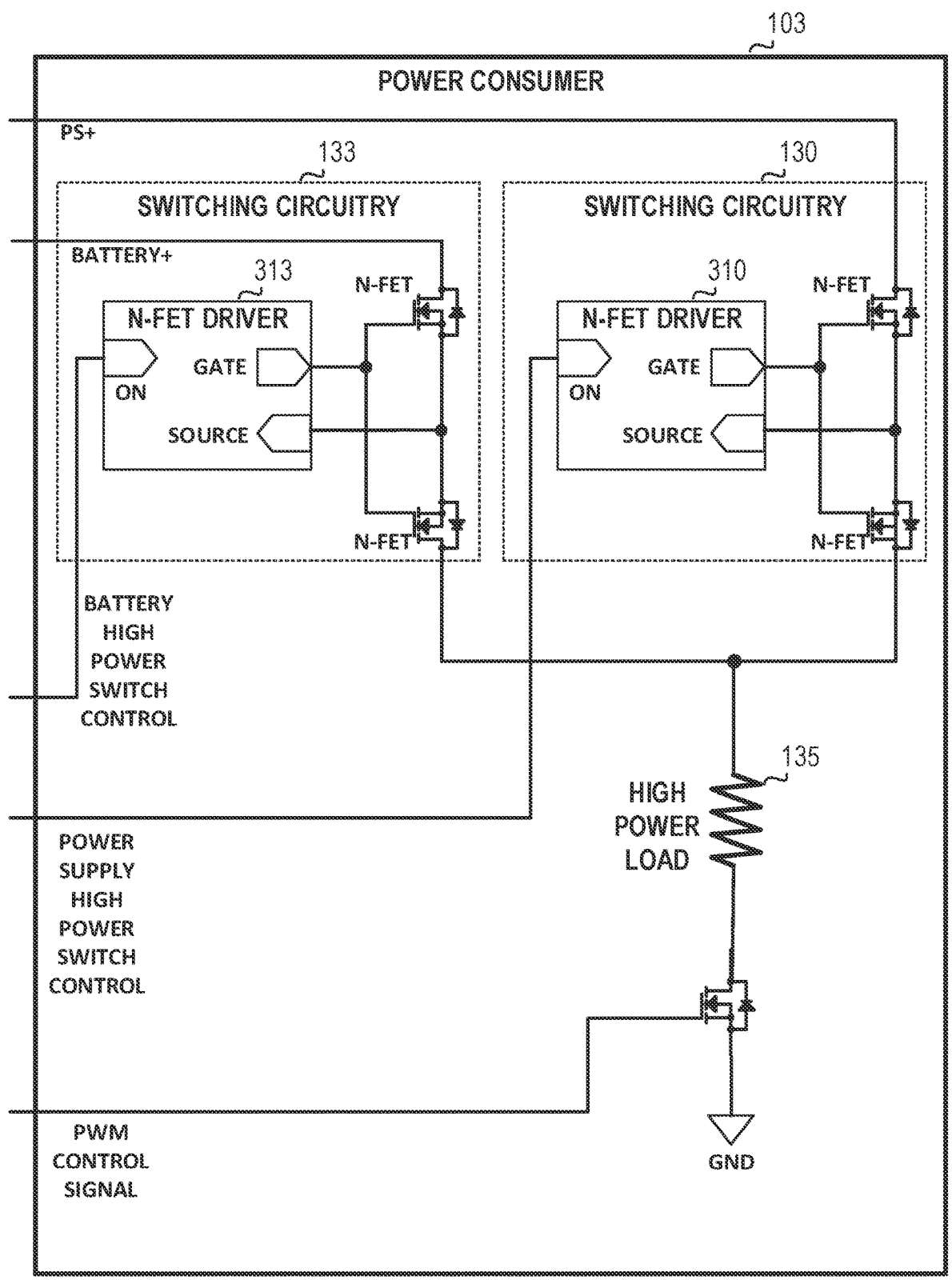
FIG. 4 is a schematic block diagram of an exemplary power consuming unit of a system for power source selection control, according to some embodiments.
Figure 5:
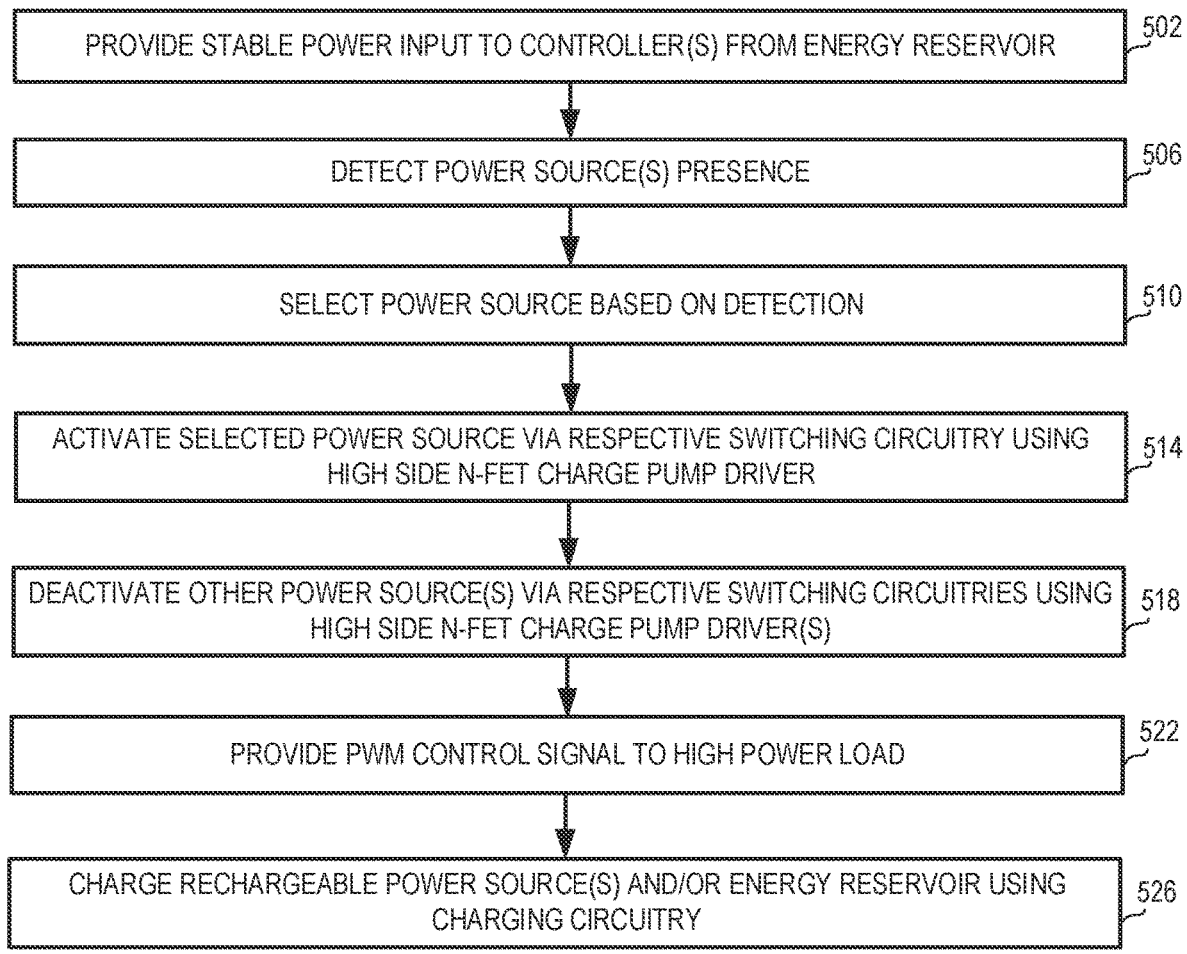
FIG. 5 is a flowchart schematically representing an optional flow of operations for power source selection control, according to some embodiments.

Reference is now made to FIG. 1 which is a schematic block diagram of an exemplary architecture of a system 100 for power source selection control, according to some embodiments. Reference is also made to FIGS. 2-4 which are schematic block diagrams of exemplary power feed unit 101, controller 102, and power consuming unit 103 of a system 100 for power source selection control, according to some embodiments. Reference is also made to FIG. 5 which is a flowchart schematically representing an optional flow of operations for power source selection control, according to some embodiments. One or more operations of the optional flow described with reference to FIG. 5 may be implemented by the system 100 for power source selection control described with reference to FIG. 1, e.g., by the controller 102 described with reference to FIG. 3 utilizing the power feed unit 101 described with reference to FIG. 2 and power consuming unit 103 described with reference to FIG. 4.

As shown in FIG. 1, a power source selection control system such as 100 may comprise a power feed unit such as 101, a controller such as 102, and a power consuming unit such as 103. The power feed unit 101 may comprise a plurality of power sources, such as 110 and 113, which may optionally be heterogeneous power sources, as described herein. The plurality of power sources 110, 113 may comprise, for example, direct current (DC) power sources, alternate current (AC) power sources, AC/DC power sources, and/or the like, as well as any combinations thereof. Additionally or alternatively, the plurality of power sources may comprise one or more rechargeable power sources, one or more non-rechargeable power sources, and/or combinations thereof. In some embodiments, one or more of the multiple power sources of power feed unit 101 may optionally be connectable to an external power supply, such as a mains power line, a power generator, and/or the like. Additionally or alternatively, the plurality of power sources may comprise one or more batteries. As a non-limiting example, power feed unit 101 may comprise a power supply such as 110 adapted to be connected to a mains power line, and a battery such as 113, which may optionally be a rechargeable battery. The power supply 110 may optionally be a DC power supply.

In some embodiments, the power feed unit 101 may comprise an energy reservoir such as 114 that may be adapted to provide stable power supply input to the controller 102, regardless of which one or more from power source(s) 110, 113 of power feed unit 101 being operated and/or switched on/off at the time, as may be performed at 502. The energy reservoir 114 may provide for load balancing and/or stabilizing the power supply to the controller 102 through interruptions and/or switches of power source(s) 110, 113.

The controller 102 may comprise and/or be implemented as one or more microcontroller(s) (MCU), microprocessor(s), state machine(s), field programmable gate array(s) (FPGA), digital signal processor(s) (DSP), application specific integrated circuit(s) (ASIC), and/or the like. The controller 102 may comprise a memory (not shown) in which code instructions executable by controller 102 may be stored, such as for example a random access memory (RAM), read-only memory (ROM), and/or the like. The memory may store code instructions that implement one or more acts of the optional flow of operations for power source selection control described with reference to FIG. 5 herein. Additionally or alternatively, one or more acts of the optional flow of operations of FIG. 5 may be implemented in hardware.

The controller 102 may be connected to and/or in communication with each of the plurality of power sources 110, 113 of the power feed unit 101. For example, as shown on FIG. 1 and further on FIGS. 2-3 at greater detail, a positive lead of each of the power sources 110, 113 may be provided as input to the controller 102, to allow, for example, to the controller 102 to sense presence and/or availability of each of the power sources 110, 113, as may be performed at 506.

The power feed unit 101 may be adapted to provide a current flow to a high power load such as 135 of the power consuming unit 103, drawn from at least one of the plurality of power sources 110, 113. The high power load 135 may be required for and/or in course of performing a high power function of the power consuming unit 103, such as for example, heating at a high rate and/or temperature, and/or the like. Each of the plurality of power sources 110, 113 may be connected to and/or disconnected from high power load 135 via a respective one of a plurality of switching circuitries of the power consuming unit 103, such as 130 and 133, connected to and controlled by the controller 102. In some embodiments, the controller may be connected to the high power load 135 and/or a channel thereof, in order, for example, to provide a pulse width modulation (PWM) signal for current control and/or the like.

As shown in FIG. 2, the power feed unit 101 may further comprise a charging module such as 112, which may be adapted for recharging one or more rechargeable power sources of power feed unit 101 such as battery 113 and/or the like, as may be performed at 526. The charging module 112 may use, in operation and/or performing the charging function thereof, one or more of non-rechargeable power sources of power feed unit 101 such as power supply 110 and/or the like. The charging module 112 may provide and/or use alternate current (AC) to charge battery 113. Optionally, the charging module 112 may charge and/or recharge the energy reservoir 114, whether directly and/or via battery 113, as may be further performed at 526 and/or otherwise. The energy reservoir 114 may receive, at an unstable input, a current flow from battery 113 and/or from power supply 110 via charging module 112. The energy reservoir 114 may provide, in turn, a stable input to the controller 102 of a current flow having a proper load balance. The plurality of power sources of power feed unit 101 such as power supply 110 and battery 113, and optionally the energy reservoir 114 as well, may be connected to a common ground, such as for example at a negative lead of each power source and/or the like. In order to prevent current leakage between the power sources 110, 113 and/or to separate the controller 102 from the high load channel, there may be placed one or more unilateral and/or asymmetrical current conductance elements, such as diodes and/or the like, at appropriate locations, e.g., in precedence of an input to battery 113 and/or energy reservoir 114 supplying power to the controller 102. For example, as illustrated on FIG. 2, a diode may be placed along an input from charging module 112 to battery 113. Similarly, a (further) diode may be placed at an input from battery 113 to energy reservoir 114.

As shown in FIG. 3, the controller 102 may be connected to the energy reservoir 114 as described with reference to FIGS. 1-2 for receiving therefrom a current flow of stable input power supply. The controller 102 may be connected to each of the plurality of power sources of power feed unit 101 such as power supply 110 and battery 113, in order to be able to detect presence thereof and accordingly to select, based on the detection, one of the power sources to be used for operating the power consuming unit 103, as may be performed at 510. The controller 102 may be connected to each of the plurality of switching circuitries 130, 133 of power consuming unit 103 corresponding to the plurality of power sources 110, 113 of power feed unit 101, for controlling activation of a selected power source, as may be performed at 514, and/or for controlling deactivation of other power source(s), as may be performed at 518. The controller 102 may control activation and/or deactivation of power source(s) using, for example, a charge pump drive at a respective one of switching circuitries 130, 133 and/or the like. Optionally the controller 102 may be connected to the high power load channel to provide, for example, a power width modulation (PWM) signal and/or the like, as may be performed at 522. The controller 102 may optionally be connected to a same common ground as of the power sources 110, 113 and energy reservoir 114.

As shown in FIG. 4, each of the switching circuitries 130, 133 of power consuming unit 103 may comprise a pair of N-Channel field-effect transistors (FETs), connected in a common source configuration, and positioned between a positive lead of a respective one of the plurality of power sources 110, 113 and the high power load 135. In some embodiments, the pair of N-channel field-effect transistors may be serially connected and/or oppositely disposed relative to one another. The pair of N-Channel FETs may be driven by voltage converters (e.g., charge pumps) such as N-FET drivers 310 and 313. The N-FET drivers (e.g., charge pumps) 310, 313 may be connected to and controlled by the controller 102 via respective high power switch control channels. The high power load 135 may be connected to and controlled by the controller 102, e.g. using PWM signals and/or the like, via a respective control channel. The high power load 135 may optionally be connected to a same common ground as of the power sources 110, 113, energy reservoir 114, and/or the controller 102. Optionally the high power load 135 may be connected to the control channel and/or the common ground via an (additional) N-Channel FET, such as illustrated on FIG. 4.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant tools and/or techniques of power supply and/or electric energy stores will be developed and the scope of the terms "power source" and "battery" is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for power source selection control, comprising:
    at least one controller adapted to be in connection with:
        a plurality of power sources of a power supply adapted for providing a current flow to a high power load via at least one of the plurality of power sources, and
        a plurality of switching circuitries corresponding to the plurality of power sources, wherein each of the plurality of switching circuitries comprising:
   at least one pair of N-channel field-effect transistors connected in a common source configuration and positioned between a positive lead of a respective one of the plurality of power sources and the high power load, and
   a voltage converter connected to the at least one controller and adapted for driving the at least one pair of N-channel field-effect transistors,
   wherein the at least one pair of N-channel field-effect transistors are connected to and driven by the voltage converter via respective gate and source terminals of the at least one pair of N-channel field-effect transistors, the respective source terminals are jointly connected to and driven by a source connection of the voltage converter, the respective gate terminals are jointly connected to and driven by a gate connection of the voltage converter;
the at least one controller being further adapted for:
   detecting presence of a current flow from at least one of the plurality of power sources; and
   in response to the detecting, selecting a respective power source of the plurality of power sources and activating a respective one of the plurality of switching circuitries for conducting a current flow from the respective power source selected to the high power load.

2. The system of claim 1, wherein the plurality of power sources are each connected to a common ground.

3. The system of claim 1, wherein for each of the at least one controller, a respective power supply channel to a respective one of the at least one controller is electrically disconnected from each of the plurality of power sources.

4. The system of claim 1, further comprising at least one energy reservoir connected to at least one of the plurality of power sources and adapted for providing a current flow to the at least one controller during transition between one of the plurality of power sources to another occurred in response to the selecting.

5. The system of claim 1, wherein the plurality of power sources comprising at least one of a direct current power source and an alternating current power source.

6. The system of claim 1, further comprising at least one charging circuitry connected to at least one pair of the plurality of power sources comprising a rechargeable power source and adapted for charging the rechargeable power source using a current flow from at least one other power source of the at least one pair.

7. The system of claim 1, wherein the at least one pair of N-channel field-effect transistors comprising at least one pair of metal-oxide-semiconductor field-effect transistors.

8. The system of claim 1, wherein a pair of N-channel field-effect transistors in the at least one pair are serially connected and oppositely disposed relative to one another.

9. A method for power source selection control, comprising:
   having connection with:
      a plurality of power sources of a power supply adapted for providing a current flow to a high power load via at least one of the plurality of power sources, and
      a plurality of switching circuitries corresponding to the plurality of power sources,
   wherein each of the plurality of switching circuitries comprising:
      at least one pair of N-channel field-effect transistors connected in a common source configuration and positioned between a positive lead of a respective one of the plurality of power sources and the high power load, and
      a voltage converter connected to the at least one controller and adapted for driving the at least one pair of N-channel field-effect transistors,
      wherein the at least one pair of N-channel field-effect transistors are connected to and driven by the voltage converter via respective gate and source terminals of the at least one pair of N-channel field-effect transistors, the respective source terminals are jointly connected to and driven by a source connection of the voltage converter, the respective gate terminals are jointly connected to and driven by a gate connection of the voltage converter;
   by at least one controller connected to the plurality of power sources and controlling the plurality of switching circuitries, performing:
      detecting presence of a current flow from at least one of the plurality of power sources; and
      in response to the detecting, selecting a respective power source of the plurality of power sources and activating a respective one of the plurality of switching circuitries for conducting a current flow from the respective power source selected to the high power load.

10. The method of claim 9, wherein the plurality of power sources are each connected to a common ground.

11. The method of claim 9, wherein for each of the at least one controller, a respective power supply channel to a respective one of the at least one controller is electrically disconnected from each of the plurality of power sources.

12. The method of claim 9, wherein at least one energy reservoir is connected to at least one of the plurality of power sources and adapted for providing a current flow to the at least one controller during transition between one of the plurality of power sources to another occurred in response to the selecting.

13. The method of claim 9, wherein the plurality of power sources comprising at least one of a direct current power source and an alternating current power source.

14. The method of claim 9, wherein at least one charging circuitry is connected to at least one pair of the plurality of power sources comprising a rechargeable power source, the method further comprising charging the rechargeable power source using a current flow from at least one other power source of the at least one pair.

15. The method of claim 9, wherein the at least one pair of N-channel field-effect transistors comprising at least one pair of metal-oxide-semiconductor field-effect transistors.

16. The method of claim 9, wherein a pair of N-channel field-effect transistors in the at least one pair are serially connected and oppositely disposed relative to one another.

17. The system of claim 1, wherein the high power load is a heater.

18. The method of claim 9, wherein the high power load is a heater.

* * * * *